Figure 1:
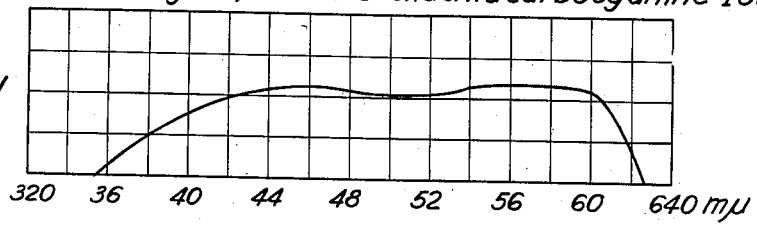

May 27, 1941.  L. G. S. BROOKER ET AL  2,243,081

PROCESS OF PREPARING 8-ALKYL UNSYMMETRICAL CARBOCYANINE DYES

Filed Sept. 10, 1937

8-Ethyl-2,2'-Dimethyl-3',4'-Benzo-oxathiacarbocyanine Iodide

8-Ethyl-2,2'-Dimethyl-3,4-Benzoxathiacarbocyanine Iodide

8-Ethyl-2,2'-Dimethyl-5,6-Benzoxathiacarbocyanine Iodide

Leslie G. S. Brooker
Frank L. White
INVENTORS

N. M. Perrins

BY Daniel J. Mayne
ATTORNEYS

Patented May 27, 1941

2,243,081

UNITED STATES PATENT OFFICE 2,243,081

PROCESS OF PREPARING 8-ALKYL UNSYMMETRICAL CARBOCYANINE DYES

Leslie G. S. Brooker and Frank L. White, Rochester, N. Y., assignors to Eastman Kodak Company, Rochester, N. Y., a corporation of New Jersey Application September 10, 1937, Serial No. 163,269

4 Claims. (Cl. 260—240)

This invention relates to new dyes and to photographic emulsions sensitized therewith. More particularly, this invention relates to new unsymmetrical carbocyanine dyes and to a new photographic emulsion sensitized to light of the green region of the spectrum.

This application is a continuation-in-part of our copending application Serial No. 30,736, filed July 10, 1935 (now United States Patent 2,112,140, dated March 22, 1938).

Photographic emulsions possessing a high green speed near to the region of red sensitivity are of considerable utility in the art. However, it has proven difficult to obtain such emulsions without at the same time appreciably increasing the speed in the region of red sensitivity. We have now found new dyes and that from these new dyes a photographic emulsion possessing a high green speed near to the region of red sensitivity can be prepared without appreciably increasing the speed in the region of red sensitivity. Photographic effects heretofore unattainable can be obtained with our new emulsion.

Accordingly, it is among the objects of our invention to provide new dyes and a process for preparing the same. A still further object is to provide a new photographic emulsion in which the green speed has been greatly increased near to the region of red sensitivity without an appreciable increase in speed in the region of red sensitivity. A still further object is to provide a process for preparing such emulsions. A still further object is to provide a photographic element comprising an emulsion in which the green speed has been greatly increased near to the region of red sensitivity without an appreciable increase in speed in the region of red sensitivity. Other objects and advantages will appear hereinafter.

Our new dyes can be called 8-alkyl-3,4-benzoxathiacarbocyanine dyes, 8-alkyl-3',4'-benzoxathiacarbocyanine dyes, 8-alkyl-5,6-benzoxathiacarbocyanine dyes, 8-alkyl-5',6'-benzo-oxathiacarbocyanine dyes, 8-alkyl-3,4-benzoxaselenacarbocyanine dyes and 8-alkyl-5,6-benzoxaselenacarbocyanine dyes. Those of our new dyes which are most advantageously employed in preparing our new emulsion can be represented by the following general formula:

I.

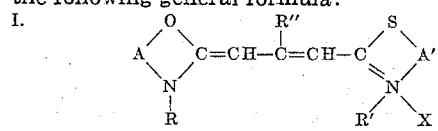

wherein A represents a divalent organic group, such as a phenylene or a naphthylene group, A' represents a naphthylene group when A represents a phenylene group and A' represents a phenylene group when A represents a naphthylene group, R, R' and R'' represent alkyl groups and X represents an acid radical. More particularly, A and A' represent a phenylene group, such as —C₆H₄—, chlorophenylene, alkylphenylene, aminophenylene or alkoxyphenylene, for example; A and A' represent a naphthylene group, such as an α-naphthylene or a β-naphthylene group, which may or may not contain substituents, such as chloro, alkyl, amino or alkoxy, for example; R, R' and R'' represent alkyl groups, such as methyl, ethyl, n-butyl, isoamyl, n-decyl or allyl, for example; and X represents an acid radical, such as halide, toluenesulfonate, alkylsulfate or perchlorate, for example.

Our new dyes can be prepared by reacting a ketone compound of the type of the following formula:

II.

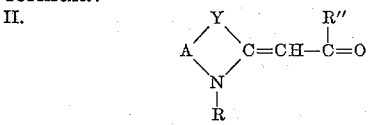

wherein A represents a phenylene or a naphthylene group and R and R'' represent alkyl groups, and Y represents sulfur or selenium with a benzoxazole or naphthoxazole quaternary salt containing a reactive alkyl group, e. g. a reactive methyl group, in the alpha position, such as 1-methylbenzoxazole quaternary salts, 1-methyl-α-naphthoxazole quaternary salts or 2-methyl-β-naphthoxazole quaternary salts. The reactions can be effected by merely heating the ketone compound and oxazole quaternary salt together. However, it is advantageous to effect the reactions in the presence of a water-binding agent. We have found that anhydrides of lower fatty acids, particularly anhydrides of acetic, propionic and butyric acids are advantageously employed as water-binding agents. Diluents can be employed in the reaction mixture. Heat accelerates the formation of our new dyes.

While the process for preparing our new dyes is subject to variation, particularly as respects the nature and quantity of ketone compound employed, the nature and quantity of oxazole quaternary salt employed, the nature and quantity of water-binding agent employed, if any, the nature and quantity of diluent employed, if any, the temperatures employed, the time of reaction and method of isolation and purification of the dyes, the following examples will serve to illustrate the manner of obtaining our new dyes.

These examples are not intended to limit our invention.

EXAMPLE 1.—*2'-ethyl-2,8-dimethyl-3,4-benzoxathiacarbocyanine iodide*

2.2 g. (1 mol.) of 1-acetylmethylene-2-ethylbenzothiazoline and 3.6 g. (1 mol.) of 2-methyl-β-naphthoxazole metho-p-toluene-sulfonate were refluxed for twenty minutes in 10 cc. of acetic anhydride. The reaction mixture was cooled and the dye precipitated with ether. The residue, which may be oily, was dissolved in methyl alcohol and the dye precipitated as the iodide with potassium iodide. The crude dye was washed with water and finally with acetone. After recrystallization from methyl alcohol, the dye was obtained as minute purplish crystals, melting at 244° to 245° C. with decomposition. The dye gave a pink solution in methyl alcohol. The dye has the following formula:

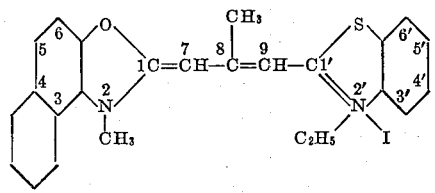

EXAMPLE 2.—*2,2'-diethyl-8-methyl-3',4'-benzooxathiacarbocyanine iodide*

2.69 g. (1 mol.) of 2-acetylmethylene-1-ethyl-β-naphthothiazoline and 2.89 g. (1 mol.) of 1-methylbenzoxazole ethiodide were refluxed for fifteen minutes in 20 cc. of acetic anhydride. The reaction mixture was cooled, ether added, chilled, and the solvent portion decanted. The residue was boiled with acetone, chilled, filtered, washed with water and dried. After recrystallization from methyl alcohol, the dye was obtained as purplish needles having a blue reflux and melting at 259° to 260° C. with decomposition. The dye has the following formula:

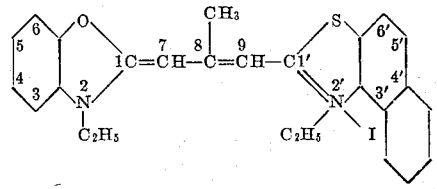

EXAMPLE 3.—*2,2',8-triethyl-3',4'-benzoxathiacarbocyanine iodide*

2.83 g. (1 mol.) of 1-ethyl-2-propionylmethylene-β-naphthothiazoline and 2.89 g. (1 mol.) of 1-methylbenzoxazole ethiodide were refluxed for fifteen minutes in 10 cc. of acetic anhydride. The reaction mixture was cooled, ether added, chilled and the solvent portion decanted. The residue was boiled with acetone, chilled, filtered, washed with water and dried. After recrystallization from 95% ethyl alcohol, the dye was obtained as dull brownish crystals, melting at 238° to 239° C. with decomposition. The dye has the following formula:

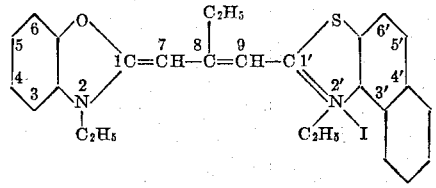

EXAMPLE 4.—*2,2'-diethyl-8-methyl-5,6-benzoxathiacarbocyanine iodide*

4.38 g. (1 mol.) of 1-acetylmethylene-2-ethylbenzothiazoline and 7.66 g. (1 mol.) of 1-methyl-α-naphthoxazole etho-p-toluenesulfonate were heated in 10 cc. of acetic anhydride at refluxing temperature for fifteen minutes. The cool reaction mixture was stirred with 200 cc. of diethyl ether and then chilled at 0° C. for several hours. The ether-acetic anhydride layer was decanted and the oily residue dissolved in hot methyl alcohol and treated with a hot aqueous solution containing a large excess of potassium iodide. The resulting mixture was allowed to stand at 0° C. for a few hours. The dye-iodide which separated was washed with cold water and then stirred with 15 cc. of boiling acetone. The dye separated from the acetone solution after standing some time at 0° C. and was collected on a filter and washed with cold acetone. After recrystallization from methyl alcohol, the dye was obtained as minute purplish crystals, melting at 266° to 269° C. with decomposition. The dye has the following formula:

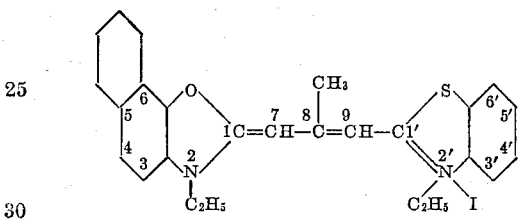

EXAMPLE 5.—*8-ethyl-2,2'-dimethyl-3,4-benzoxathiacarbocyanine iodide*

4.38 g. (1 mol.) of 2-methyl-1-propionylmethylene-benzothiazoline and 7.38 g. (1 mol.) of 2 - methyl - β - naphthoxazole metho - p - toluenesulfonate were heated in 10 cc. of acetic anhydride at the refluxing temperature for fifteen minutes. The cool reaction mixture was stirred with 200 cc. of diethyl ether and then chilled at 0° C. for several hours. The ether-acetic anhydride layer was decanted and the oily residue dissolved in hot methyl alcohol and treated with a hot aqueous solution containing a large excess of potassium iodide. The dye-iodide separated from the reaction mixture after standing at 0° C. for a few hours. It was washed with cold water and then stirred with 15 cc. of boiling acetone. The dye separated from the resulting solution after standing at 0° C. and was collected on a filter and washed with cold acetone. After two recrystallizations from 95% ethyl alcohol, the dye was obtained as dull purplish crystals, melting at 245° to 246° C. with decomposition. The dye has the following formula:

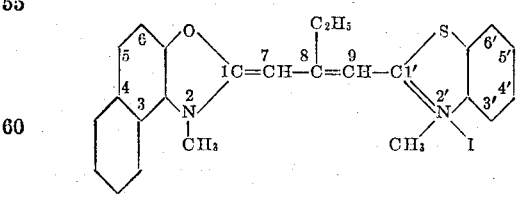

EXAMPLE 6.—*8-ethyl-2,2'-dimethyl-3',4'-benzooxathiacarbocyanine iodide*

5.38 g. (1 mol.) of 1-methyl-2-propinoylmethylene-β-naphthothiazoline and 5.5 g. (1 mol) of 1-methylbenzoxazole methiodide were heated at refluxing temperature in 20 cc. of propionic anhydride for about ten minutes. The cool reaction mixture was stirred with 250 cc. of diethyl ether and then chilled at 0° C. for several hours. The ether-acetic anhydride layer was decanted and the oily residue was stirred with 15 cc. of boiling acetone. After standing at 0° C. for a few hours, the dye separated from the acetone solution. It was filtered off and washed with cold acetone. After two recrystallizations from 95% ethyl alcohol, the dye was obtained as orange-red crystals, melting at 238° to 239° C. with decomposition. The dye has the following formula:

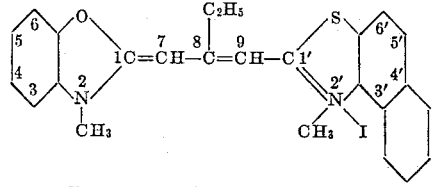

EXAMPLE 7.—*2',8-diethyl-2-methyl-3',4'-benzo-oxathiacarbocyanine iodide*

2.83 g. (1 mol.) of 2-ethyl-1-propionylmethylene-β-naphthothiazoline and 2.75 g. (1 mol.) of 1-methylbenzoxazole methiodide were heated in 15 cc. of acetic anhydride at the refluxing temperature for fifteen minutes. The cool reaction mixture was stirred with 250 cc. of diethyl ether and then chilled at 0° C. for several hours. The ether-acetic anhydride layer was decanted and the oily residue was stirred with 15 cc. of boiling acetone. After standing at 0° C. for a few hours, the dye separated from the acetone solution and was collected on a filter where it was washed with cold acetone. After two recrystallizations from a mixture of acetone and methyl alcohol, the dye was obtained as garnet needles having a blue reflex and melting at 251° to 253° C. with decomposition. The dye has the following formula:

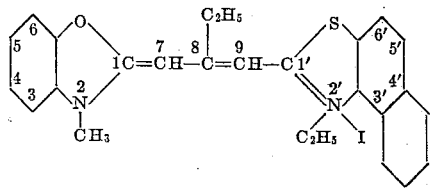

EXAMPLE 8.—*2,2'-diethyl-8-methyl-3,4-benzoxathiacarbocyanine iodide*

4.38 g. (1 mol.) of 1-acetylmethylene-2-ethylbenzothiazoline and 7.66 g. (1 mol.) of 2-methyl-β-naphthoxazole etho-p-toluenesulfonate were heated in 20 cc. of acetic anhydride at the refluxing temperature for about fifteen minutes. The cool reaction mixture was stirred with 200 cc. of diethyl ether and then chilled at 0° C. for several hours. The ether-acetic anhydride layer was decanted and the oily residue was dissolved in hot methyl alcohol and treated with a hot aqueous solution containing a large excess of potassium iodide. After the resulting mixture had stood at about 0° C. for a few hours, the dye-iodide separated. It was washed with cold water and then stirred with 15 cc. of boiling acetone. The dye separated from the resulting acetone solution after standing some time at 0° C. and was collected on a filter and washed with cold acetone. After two recrystallizations from 95% ethyl alcohol, the dye was obtained as dull reddish crystals having a green reflex and melting at 258° to 259° C. with decomposition. The dye has the following formula:

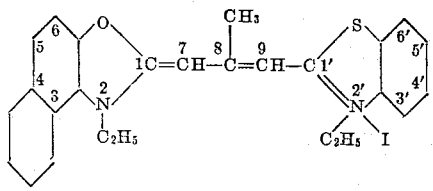

EXAMPLE 9.—*2,2'-diethyl-8-methyl-5,6-benzoxaselenacarbocyanine iodide*

1.37 g. (1 mol.) of 1-methyl-α-naphthoxazole and 1.50 g. (1 mol.) of ethyl-p-toluenesulfonate were heated at 115° to 120° C. for about thirty-six hours. The crude quaternary salt and 2.0 g. (1 mol.) of 1-acetylmethylene-2-ethylbenzoselenazoline were heated in about 15 cc. of acetic anhydride at the refluxing temperature for about fifteen minutes. The cooled reaction mixture was diluted with 100 cc. of diethyl ether and chilled at 0° C. for about two hours. The ether-acetic anhydride layer was decanted and the residue dissolved in 10 cc. of hot methyl alcohol and treated with a hot solution of three grams of potassium iodide dissolved in 25 cc. of water. The resulting mixture was chilled at 0° C. for about twelve hours. The crude dye which separated was washed with water. It was then boiled with acetone, the solution chilled and the dye filtered off and washed with acetone. The residue was boiled with acetone a second time, the solution chilled and the dye filtered off and washed with hot acetone. After recrystallization from methyl alcohol, the dye was obtained as orange crystals melting at 269° to 271° C. with decomposition. The dye has the following formula:

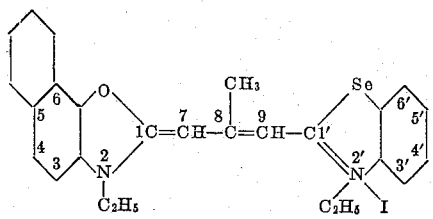

EXAMPLE 10.—*8-ethyl-2,2'-dimethyl-5,6-benzoxathiacarbocyanine iodide*

4.38 g. (1 mol.) of 2-methyl-1-propionylmethylene-benzothiazoline and 7.38 g. (1 mol.) of 1-methyl-α-naphthoxazole metho-p-toluenesulfonate were heated in 20 cc. of propionic anhydride at the refluxing temperature for seven minutes. The cool reaction mixture was stirred with 200 cc. of diethyl ether and then chilled at 0° C. for several hours. After the ether-acetic anhydride layer was decanted, the oily residue was dissolved in hot methyl alcohol and treated with a hot aqueous solution containing a large excess of potassium iodide. The dye-iodide separated from the resulting mixture after standing at 0° C. for a few hours. It was washed with cold water and then stirred with 15 cc. of boiling acetone. The dye separated from the acetone solution after standing some time at 0° C. It was collected on a filter and washed with cold acetone. After two recrystallizations from methyl alcohol, the dye was obtained as reddish crystals, melting at 282° to 285° C. with decomposition. The dye has the following formula:

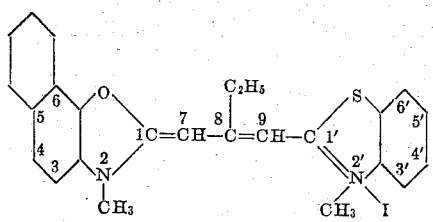

When employing the oxazole toluenesulfonates it is avdantageous to convert the resulting dye-toluenesulfonate to the dye-iodide as illustrated in a number of the above examples, owing to the fairly soluble nature of the dye-toluenesulfonates.

The dyes can similarly be conveniently isolated as the bromides or perchlorates with potassium bromide or sodium perchlorate.

The ketone compounds employed in our process can be prepared by reacting a benzothiazole or naphthothiazole quaternary salt containing a reactive alkyl group, e. g. a reactive methyl group in the alpha position with an acyl halide in the presence of an acid-binding agent. Pyridine is advantageously employed as the acid-binding agent. The process for preparing the ketone compounds is fully described in our copending application Serial No. 29,916, filed July 5, 1935, as well as in British Patent 466,269. Instead of naming the ketone compounds as acylmethylene derivatives, they can also be named as ketone derivatives. For example, 1-acetylmethylene-2-ethylbenzothiazoline can also be called 1-acetonylidene -2-ethylbenzothiazoline.

The toluenesulfonate quaternary salts employed in the above examples can be prepared in the usual manner by heating the oxazole base with a toluenesulfonate ester. The following examples are illustrative:

EXAMPLE 11.—2-methyl-β-naphthoxazole metho-p-toluenesulfonate.

1.83 g. (1 mol.) of 2-methyl-β-naphthoxazole and 1.86 g. (1 mol.) of metho-p-toluenesulfonate were heated together at 100° C. for about 24 hours. The resulting crude product was employed without further purification.

EXAMPLE 12.—2-methyl-β-naphthoxazole etho-p-toluenesulfonate.

3.66 g. (1 mol.) of 2-methyl-β-naphthoxazole and 4.0 g. (1 mol.) of etho-p-toluenesulfonate were heated together at 115° to 120° C. for about thirty hours. The resulting crude product was employed without further purification. The etho-p-toluenesulfonate of 1-methyl-α-naphthoxazole was made in exactly the same manner.

The alkoidide quaternary salts employed in the above examples are made in the usual well-known manner by heating the oxazole bases with the appropriate alkyliodide. We have found it advantageous to employ one molecular proportion of the oxazole quaternary salt to react with one molecular proportion of the ketone compound. However, an excess of either can be employed.

Our new unsymmetrical dyes give rise to photographic emulsions possessing high green speeds near to the region of red sensitivity, when incorporated in the emulsions. Our invention is particularly directed to the customarily employed gelatino-silver-halide emulsions. However, our new unsymmetrical dyes can be employed in emulsions in which the carrier is other than gelatin, for example, a resinous substance or cellulosic derivative which has substantially no deleterious effect on the light-sensitive materials. As silver halide emulsions, we include such emulsions as are commonly employed in the art, for example, silver chloride or silver bromide emulsions which can contain other salts which may be light sensitive. By way of illustration, the herein-described sensitized photographic emulsions were prepared employing ordinary gelatino-silver-bromide emulsions.

In the preparation of photographic emulsions containing our new unsymmetrical dyes, it is only necessary to disperse the dyes in the emulsions. The methods of incorporating dyes in emulsions are simple and well known to those skilled in the art. In practicing our invention it is convenient to add the dyes from their solutions in appropriate solvents. The solvent must, of course, be compatible with the emulsion, substantially free from any deleterious effect on the light-sensitive materials and capable of dissolving the dyes. Methanol has proven satisfactory as a solvent for our new dyes. The dyes are advantageously incorporated in the finished, washed emulsion and should be uniformly distributed throughout to secure the best results.

The concentration of our new unsymmetrical dyes in the emulsions can vary widely, e. g. from about 5 to about 100 mg. per liter of flowable emulsion. The concentration of the dye will vary according to the type of light-sensitive material in the emulsion and according to the effects desired. The suitable and most economical concentration for any given emulsion will be apparent to those skilled in the art, upon making the ordinary tests and observations customarily used in the art of emulsion making. To prepare a gelatino-silver-halide emulsion, the following procedure is satisfactory: A quantity of the dye is dissolved in methyl alcohol or acetone and a volume of this solution (which may be diluted with water) containing from 5 to 100 mg. of dye is slowly added to about 1000 cc. of a flowable gelatino-silver-halide emulsion with stirring. Stirring is continued until the dye is uniformly and practically homogeneously dispersed. Ordinarily 10 to 20 mg. of dye per 1000 cc. of flowable emulsion will suffice to produce the maximum sensitizing effect with the ordinary gelatino-silver-halide emulsions. The above statements are only illustrative and not to be understood as limiting our invention in any sense, as it will be apparent that our dyes can be incorporated by other methods in many of the photographic emulsions customarily employed in the art, such, for instance, as by bathing the plate or film, upon which the emulsion has been coated, in a solution of the dye in an appropriate solvent, although such a method is ordinarily not to be preferred. The claims are intended to cover any combination of these new dyes with a photographic silver halide emulsion, whereby the dye exerts a sensitizing effect upon the emulsions, as well as a photographic element comprising a support, ordinarily transparent, upon which the light-sensitive emulsion is coated or spread and allowed to dry.

Our new unsymmetrical dyes give rise to photographic emulsions possessing much higher green speeds than the known emulsions containing dyes which sensitize photographic emulsions to the green region and near to the red region of sensitivity. Compared to emulsions sensitized to the green with known sensitizing unsymmetrical carbocyanine dyes, the sensitivity of emulsions sensitized with our new unsymmetrical carbocyanine dyes is always at least 50% greater, and in the vast majority of cases is about 100% greater as measured through a green filter (Wratten Light Filter No. 58). As measured through a minus blue filter (Wratten Light Filter No. 12), a more generally useful measure of total sensitivity, the sensitivity of emulsions sensitized with our new unsymmetrical carbocyanine dyes is from 100 to 150% greater, in the vast majority of cases.

The accompanying drawing is by way of illustration and depicts the sensitivity of emulsions containing three of our new dyes. Each figure in the drawing is a diagrammatic reproduction of a spectrogram showing the sensitivity of a silver bromide emulsion containing one of our new dyes.

In Fig. 1, the sensitivity of an ordinary gelatino-silver-bromide emulsion containing 8-ethyl - 2,2' - dimethyl - 3',4'-benzo-oxathiacarbocyanine iodide is depicted. The H and D speed of this emulsion, as measured through a Wratten Green Filter No. 58, is 21.4, and, as measured through a Wratten Minus Blue Filter No. 12, is 79.4.

Figure 2:
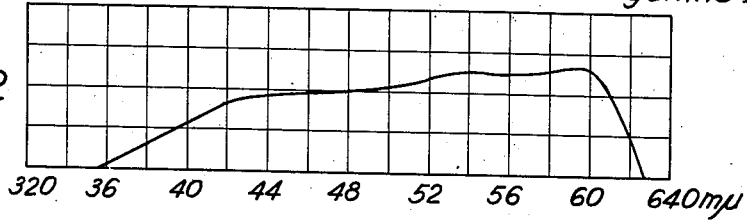

In Fig. 2, the sensitivity of an ordinary gelatino-silver-bromide emulsion containing 8-ethyl - 2,2' - dimethyl - 3,4-benzoxathiacarbocyanine iodide is depicted. The H and D speed of this emulsion, as measured through a Wratten Green Filter No. 58, is 18.6, and, as measured through a Wratten Minus Blue Filter No. 12, is 70.8.

Figure 3:
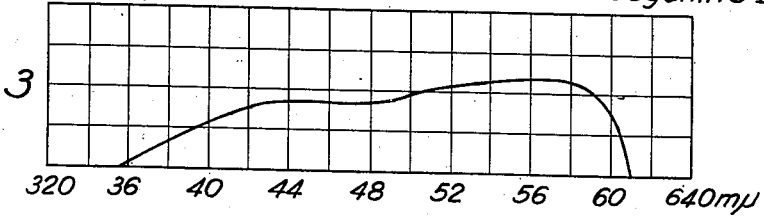

In Fig. 3, the sensitivity of an ordinary gelatino-silver-bromide emulsion containing 8-ethyl-2,2'-dimethyl-5,6-benzoxathiacarbocyanine iodide is depicted. The H and D speed of this emulsion, as measured through a Wratten Green Filter No. 58, is 19.0, and, as measured through a Wratten Minus Blue Filter No. 12, is 58.9.

We have found that those of our new unsymmetrical carbocyanine dyes which contain a methyl group in the 8-position and alkyl groups containing at least two carbon atoms, such as ethyl, propyl or butyl groups, attached to the trivalent and quinquevalent nitrogen atoms are especially useful sensitizers of photographic emulsions, particularly gelatino-silver-halide emulsions.

Still further examples illustrating our invention could be cited, but the foregoing will be sufficient to teach those skilled in the art the manner in which our invention is carried out.

What we claim as our invention and desire to be secured by Letters Patent of the United States is:

1. A process for preparing a carbocyanine dye comprising reacting, in the presence of a water-binding agent, a cyclammonium quaternary salt selected from the group consisting of 1-methyl-benzoxazole quaternary salts and $\mu$-methylnaphthoxazole quaternary salts with a ketone compound of the following formula:

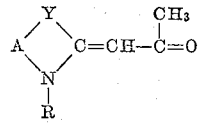

wherein A represents an organic group selected from the group consisting of phenylene and naphthylene groups, R represents alkyl groups and Y represents an atom selected from the group consisting of sulfur and selenium.

2. A process for preparing a carbocyanine dye comprising reacting, in the presence of a water-binding agent, a 2-methyl-$\beta$-naphthoxazole quaternary salt with 1-acetylmethylene-2-ethyl-benzothiazoline.

3. A process for preparing a carbocyanine dye comprising reacting, in the presence of a water-binding agent, a 1-methyl-benzoxazole quaternary salt with 2-acetylmethylene-1-ethyl-$\beta$-naphthothiazoline.

4. A process for preparing a carbocyanine dye comprising reacting, in the presence of a water-binding agent, a 1-methyl-$\alpha$-naphthoxazole quaternary salt with 1-acetylmethylene-2-ethyl-benzothiazoline.

LESLIE G. S. BROOKER.
FRANK L. WHITE.